US007653203B2

(12) United States Patent
Holmi et al.

(10) Patent No.: US 7,653,203 B2
(45) Date of Patent: Jan. 26, 2010

(54) VEHICLE AUDIO SYSTEM SURROUND MODES

(75) Inventors: Douglas J. Holmi, Marlborough, MA (US); Lee A. Prager, Berlin, MA (US); Guy A. Torio, Ashland, MA (US)

(73) Assignee: Bose Corporation, Framingham, MA (US)

( * ) Notice: Subject to any disclaimer, the term of this patent is extended or adjusted under 35 U.S.C. 154(b) by 977 days.

(21) Appl. No.: 10/756,028

(22) Filed: Jan. 13, 2004

(65) Prior Publication Data

US 2005/0152562 A1 Jul. 14, 2005

(51) Int. Cl.
*H04B 1/00* (2006.01)

(52) U.S. Cl. .......................... 381/86; 381/302; 381/109

(58) Field of Classification Search ................... 381/86, 381/98, 101, 104–109, 59, 302, 119, 102
See application file for complete search history.

(56) References Cited

U.S. PATENT DOCUMENTS

| | | | | |
|---|---|---|---|---|
| 5,146,507 | A * | 9/1992 | Satoh et al. | 381/103 |
| 5,428,687 | A | 6/1995 | Willcocks et al. | |
| 5,661,811 | A * | 8/1997 | Huemann et al. | 381/309 |
| 5,680,468 | A * | 10/1997 | Van Hout et al. | 381/86 |
| 5,754,664 | A * | 5/1998 | Clark et al. | 381/86 |
| 5,815,580 | A | 9/1998 | Craven et al. | |
| 5,983,087 | A | 11/1999 | Milne et al. | |
| 6,788,931 | B2 * | 9/2004 | Cox et al. | 455/414.1 |
| 7,092,531 | B2 * | 8/2006 | Enya et al. | 381/86 |
| 2002/0076065 | A1 * | 6/2002 | Yamamoto et al. | 381/104 |
| 2002/0181713 | A1 * | 12/2002 | Kato et al. | 381/56 |
| 2002/0181718 | A1 * | 12/2002 | Kato et al. | 381/86 |
| 2003/0179891 | A1 * | 9/2003 | Rabinowitz et al. | 381/103 |

(Continued)

FOREIGN PATENT DOCUMENTS

EP 0 729 227 8/1996

(Continued)

OTHER PUBLICATIONS

European Examination Report issued on Apr. 25, 2007, in European Application No. 05250053.5, filed Jan. 7, 2005.

(Continued)

*Primary Examiner*—Vivian Chin
*Assistant Examiner*—Disler Paul
(74) *Attorney, Agent, or Firm*—Fish & Richardson P.C.

(57) ABSTRACT

A surround audio system for a vehicle with a plurality of operating modes. The vehicle includes seating locations. The audio system includes a plurality of input channels including surround channels. The audio system further includes a plurality of operating modes. A first operating mode is characterized by substantially equal perceived loudnesses at each of said seating locations, an equalization pattern developed by weighting frequency responses at each of said seating locations substantially equally, and a balance pattern developed by weighting sound pressure level measurements at each of said seating locations substantially equally. A second operating mode is characterized by greater perceived loudness at one of said seating locations than at the other seating locations, an equalization pattern developed by weighting the frequency response at said one of said seating locations more heavily than the frequency responses at said other seating locations, and a balance pattern developed by weighting sound pressure level measurements at said one seating location more heavily than the weightings as said other seating locations.

9 Claims, 15 Drawing Sheets

U.S. PATENT DOCUMENTS

| | | | | |
|---|---|---|---|---|
| 2005/0074131 | A1 * | 4/2005 | Mc Call et al. | 381/86 |
| 2005/0271219 | A1 * | 12/2005 | Bruelle-Drews | 381/86 |

FOREIGN PATENT DOCUMENTS

| | | | |
|---|---|---|---|
| EP | 1 263 263 | | 12/2002 |
| EP | 1 280 377 | | 1/2003 |
| WO | WO0124579 | A2 | 4/2001 |
| WO | WO 02/065815 | | 8/2002 |
| WO | WO03069951 | A1 | 8/2003 |

OTHER PUBLICATIONS

Office action in corresponding Chinese application No. 200510003639.6, dated Mar. 27, 2009.

* cited by examiner

Normal Surround
Mode Fade Front

Normal Surround
Mode Fade Rear

Rear Surround
Mode Fade Rear

VEHICLE AUDIO SYSTEM SURROUND MODES

BACKGROUND OF THE INVENTION

The invention is directed to surround audio system for vehicles and more specifically to surround audio systems having operating modes.

BRIEF SUMMARY OF THE INVENTION

In one aspect of the invention, an audio system for a vehicle with a plurality of seating locations includes a plurality of input channels including surround channels. The audio system further includes a plurality of operating modes. A first operating mode is characterized by substantially equal perceived loudnesses at each of said seating locations, an equalization pattern developed by weighting frequency responses at each of said seating locations substantially equally, and a balance pattern developed by weighting sound pressure level measurements at each of said seating locations substantially equally. A second operating mode is characterized by greater perceived loudness at one of said seating locations than at the other seating locations, an equalization pattern developed by weighting the frequency response at said one of said seating locations more heavily than the frequency responses at said other seating locations, and a balance pattern developed by weighting sound pressure level measurements at said one seating location more heavily than the weightings as said other seating locations.

In another aspect of the invention, a method for developing an equalization pattern for a multichannel surround audio system for a vehicle that includes a plurality of seating locations includes weighting frequency response measurements at one of said seating locations more heavily than frequency response at other seating positions.

In another aspect of the invention, a method for developing an equalization pattern for a multichannel surround audio system for a vehicle that includes a plurality of seating locations includes weighting sound pressure level measurements at one of said seating locations more heavily than frequency response at other seating positions.

In another aspect of the invention, front/rear fade system for an audio system for a vehicle includes a plurality of seating locations and a plurality of loudspeakers. The loudspeakers including front loudspeakers, intermediate loudspeakers and rear loudspeakers. The audio system includes a plurality of input channels, the input channels includes surround channels. The front/rear fade system comprising a plurality of operating modes. A first operating mode is characterized by a fade front condition in which the radiation from said front loudspeakers is affected by said front/rear fade system. A second operating mode is characterized by a fade front condition in which the radiation from said front loudspeakers is not affected by said front/rear fade system.

Other features, objects, and advantages will become apparent from the following detailed description, when read in connection with the accompanying drawing in which:

DETAILED DESCRIPTION

Figure 1:
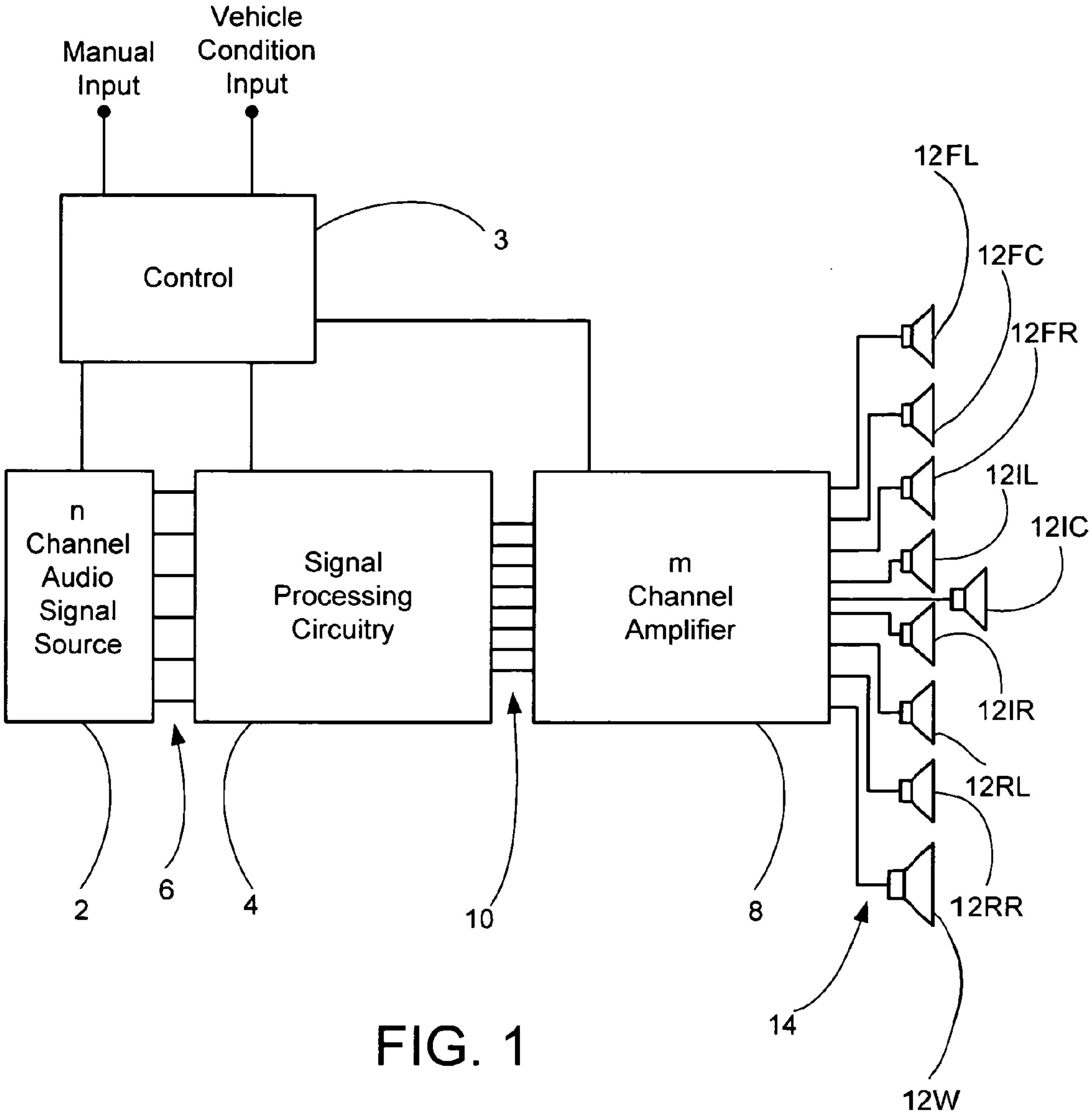
FIG. 1 is a block diagram of an audio system in accordance with the invention.

Though the elements of the several views of the drawing are shown as discrete elements in a block diagram and are referred to as "circuitry", unless otherwise indicated, the elements may be implemented as a microprocessor executing software instructions, which may include digital signal processing (DSP) instructions. Unless otherwise indicated, signal lines may be implemented as discrete analog signal lines, as a single discrete digital signal line with appropriate signal processing to process separate streams of audio signal, or as elements of a wireless communication system. Unless otherwise indicated, audio signals may be encoded in either digital or analog form, with appropriate analog-to-digital or digital-to-analog converters.

For simplicity of wording "radiation corresponding to the audio signals in channel A (where A is a channel identifier of a multi-channel system)" or "radiating acoustic energy corresponding to signals in channel A" will be expressed as "radiating channel A," and "radiating acoustic energy corresponding to signal B (where B is an identifier of an audio signal)" will be expressed as "radiating signal B", it being understood that acoustic radiating devices transduce audio signals, expressed in analog or digital form, into acoustic energy.

Referring now to the drawing and more particularly to FIG. 1, there is shown an audio system according to the invention. N-channel audio signal source 2 is communicatingly coupled to signal processing circuitry 4 by signal lines 6. Control circuitry 3 may be communicatingly coupled to audio signal source 2, to signal processing circuitry 4, and may be communicatingly coupled directly to m-channel amplifier 8. Control circuitry 3 may have input terminals for receiving manual input or for collecting information about operating conditions of the vehicle or both. Signal processing circuitry 4 is communicatingly coupled to m-channel amplifier 8 by signal lines 10. M-channel amplifier 8 (where "m" is a number) is coupled to loudspeakers, designated 12FL (front left); 12FC (front center); 12FR (front right); 12IL (intermediate left); 12IC (intermediate center); 12IR (intermediate right); 12RL (rear left); 12RR (rear right); and 12W (subwoofer) by signal lines 14. The number and configuration of the loudspeakers may vary from this example.

N-channel audio signal source 2 may be a conventional source of audio signals, such as a CD or DVD player, a digital storage device, such as a mass storage device or a random access memory, or a radio tuner. The examples following will use a 5.1 (i.e. n=5.1, indicating five directional channels and one low frequency effects [LFE] channel) channel source. The audio signal source could have more than five directional channels (i.e. n=6.1, 7.1, . . . ) and may not have a low frequency effects channel ( i.e. n=5, 6, 7, . . . ). Typically n channel sources include some channels (typically left (L), right (R), and center (C) channels) that are intended to be perceived as coming from the front; hereinafter, these channels will be referred to as front channels. Typically n channel sources include some channels that are intended to be perceived as coming from behind; hereinafter, these channels will be referred to as surround channels.

For best results, the n channels should include rear or surround channels. If the n channels do not include rear or surround channels, signal processing circuitry 4 may contain signal processing circuitry for providing surround channels. Examples of such signal processing circuitry are the Videostage® decoding circuitry or the Centerpoint™ decoding circuitry of Bose Corporation of Framingham, Mass., or the Pro Logic® decoding circuitry or the Pro Logic® II decoding circuitry available from Dolby Corporation of San Francisco, Calif.

Signal processing circuitry 4 receives as input signals the n channels from the audio signal source, processes the signals, and provides as output streams of processed audio signals to amplifier 8. The signal processing may include equalization circuitry, combining circuitry and the like. Amplifier 8 has m output channels. In the following examples, m=9, but m can be more than or fewer than 9, in which case there may be as m or more loudspeaker or other devices in the playback system. Loudspeakers 12FL-12W may be conventional loudspeakers, and each loudspeaker may contain one or more acoustic drivers and one or more acoustic elements, such as enclosures, ports, waveguides, horns, or passive radiators. In the event that one or more of loudspeakers 12FL-12W contain more than one acoustic driver, the loudspeakers may include crossover circuitry. Some elements, such as a volume control, that can affect the gain that is applied to the audio signals by the amplifier 8 are not shown in this view. Signal processing circuitry 4 and amplifier 8 may be incorporated into a single device. There may be additional elements that apply passive signal processing to the amplified audio signals subsequent to the amplifier 8 Control circuitry 3 will be discussed in more detail below.

Figure 2:
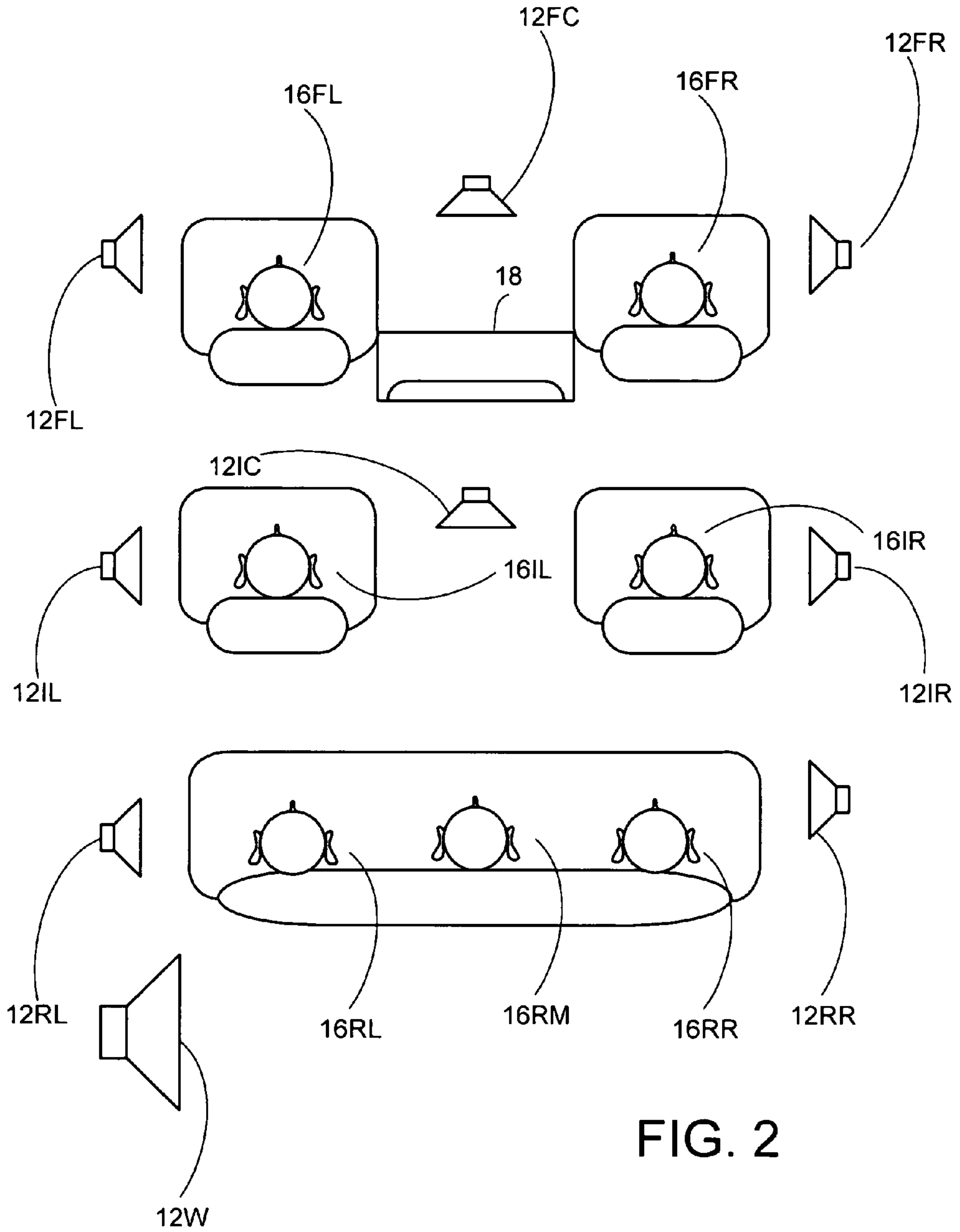
FIG. 2 is an acoustic environment appropriate for then invention.

FIG. 2 shows an example of an acoustic environment appropriate for the invention. A vehicle (such as a sport utility vehicle or minivan) interior includes front seating positions 16FL and 16FR, intermediate seating positions 16IL and 16IR, and rear seating positions 16RL, 16RM, and 16RR. Loudspeakers 12FL-12W are arranged about the vehicle interior as shown. A typical loudspeaker type and location for loudspeaker 12FL is a full range, midrange, or bass acoustic driver to the left of and forward of the driver seat location, such as in the driver side door with an additional tweeter unit in the dashboard or the left A-pillar; for loudspeaker 12FC a limited range loudspeaker near the middle of the dashboard; for loudspeaker 12IL a full range loudspeaker forward of the intermediate seating position and behind the front seating position, such as in the left rear door; for loudspeaker 12IC a full range or limited range acoustic driver in a central location, such as in a console facing the rear seating area; for loudspeaker 12RL a full range loudspeaker behind the left rear seating position, such as in the left side of the tailgate or near a left rear pillar of the vehicle. Loudspeakers 12FR, 12IR, and 12RR are typically of the same type as, positioned symmetrically to, loudspeakers 12FL, 12IL, and 12RL, respectively. Loudspeaker 12W may be a subwoofer loudspeaker, and may be placed in any convenient location, such as behind, under, or near the rear seat. Video monitor 18 is positioned in front of the intermediate seating positions 16IL and 16IR and facing the rear of the vehicle interior, for example in a console or in a drop-down device in the vehicle roof. There may be video monitors in other positions, such as in the seat backs.

The configuration of FIG. 2 is exemplary and many other configurations are possible. Any of the loudspeakers 12FL, 12FC, 12FR, 12IL, 12IC, 12IR, 12RL, 12RR may have the configuration of loudspeaker 12FC of FIG. 2, in which the loudspeaker is a limited range loudspeaker to reproduce high or mid and high frequencies, with low frequency signals related to signals reproduced by the limited range loudspeaker re-directed to a full range loudspeaker or a woofer or subwoofer loudspeaker, such as loudspeaker 12W. Any of the loudspeakers 12FL, 12FC, 12FR, 12IL, 12IC, 12IR, 12RL, 12RR may have the configuration of loudspeaker 12FL, in which there is more than one acoustic driver. The two acoustic drivers may be separated, such as one in a passenger door and one in an A-pillar. There may also be additional loudspeakers about the vehicle cabin.

A feature of the invention is the provision of multiple surround modes. In a first mode (hereinafter "normal surround mode"), the equalization, fade behavior, and balance takes into account the entire passenger compartment and the perceived loudness does not vary markedly from location to location. In a second mode (hereinafter "rear surround mode"), the equalization, fade behavior, and balance weights the rear seating positions more heavily than the front seating locations, and the perceived loudness is lower in front than in the intermediate and rear seating locations. In a third mode, hereinafter "front surround mode," the equalization, fade behavior, and balance weights the front seating positions more heavily than the rear seating locations and the perceived loudness is greater in the front seating locations than in the intermediate and rear seating locations. In a fourth mode (hereinafter "driver surround mode"), the equalization and balance weights the driver's seating position more heavily than the other seating positions, and the perceived loudness is greater at the driver seat than at other seating locations. In all four modes, weighting more heavily can include using measurements and listenings from some seating positions to the exclusion of other positions.

The normal surround mode may be appropriate when the audio program is of interest to both front seat passengers and to rear seating area passengers. The rear surround mode may be appropriate when the audio program content is of greater interest to passengers in the rear seating rows of the vehicle passenger compartment, for example, if the audio program content is associated with visual images being displayed on the monitor or if the front seat passengers wish to carry on a conversation, or if the driver wishes to focus attention on some other audio stimulus, such as a navigation system. The front surround mode may be appropriate if the audio program is not of interest to the rear seat passengers, if it desirable for reduced sound in the rear seats of the vehicle (for example if there are sleeping children in the rear seat), or if there are no rear seat passengers at all. The driver surround mode may be appropriate in circumstances similar to the front surround mode if the front passenger seat is unoccupied.

As stated above, one example of a situation in which a rear surround mode is appropriate is when the audio program content is associated with visual images being displayed on a monitor. Monitors for the purpose of displaying visual images associated with movies are often placed so that they can be seen by rear seat passengers and not seen by the front seat passengers. Since, in a movie, the audio program is associated with visual images that cannot be seen by the front seat passengers, the audio program may be irrelevant or confusing to the front seat passengers, or may even be annoying, distracting, or dangerous. Additionally, the sound quality may be equalized and balanced for front seat positions (to whom the audio program is irrelevant), at the expense of intermediate and rear seat positions (to whom the audio program is important). Normal front/rear fade patterns may also be inappropriate in some circumstances, such as if the audio program is associated with visual images on a monitor. In a normal front/rear fade pattern in a vehicle, at one extreme the perceived loudness of the front speaker radiation is much higher than the perceived loudness of the rear speaker radiation. If the audio program is associated with visual images on the monitor, it may be more appropriate for the corresponding extreme front/rear fade situation to be such that the amplitude of the intermediate speaker radiation is much higher than the amplitude of the rear speaker radiation and the front speaker radiation.

Figure 3A:
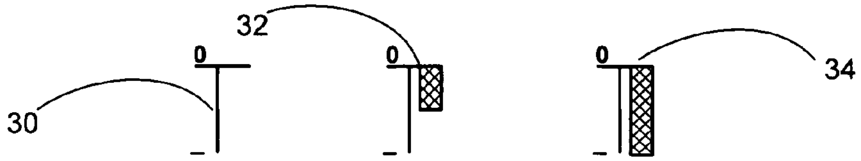
FIGS. 3A-3E are various views illustrating an aspect of the invention.

FIGS. 3A-3E illustrate the perceived loudness behavior of the audio system in the various modes. FIG. 3A explains some icons used in other views. Perceived loudness indicator 30 indicates a reference perceived loudness. The reference perceived loudness is typically the perceived loudness at the position(s) of most interest, or the positions of fade bias (which will be explained below). Perceived loudness indicator 32 indicates a perceived loudness that is audibly less than the reference perceived loudness indicator 30. Perceived loudness indicator 34 indicates a perceived loudness that is audibly less than perceived loudness indicator 32. The icons are intended to indicate general relationships and not precise measurements. The icons are for comparing within a single view only; for example, the perceived loudness indicated by amplitude indicator 30 may differ from figure to figure.

Figure 3B:
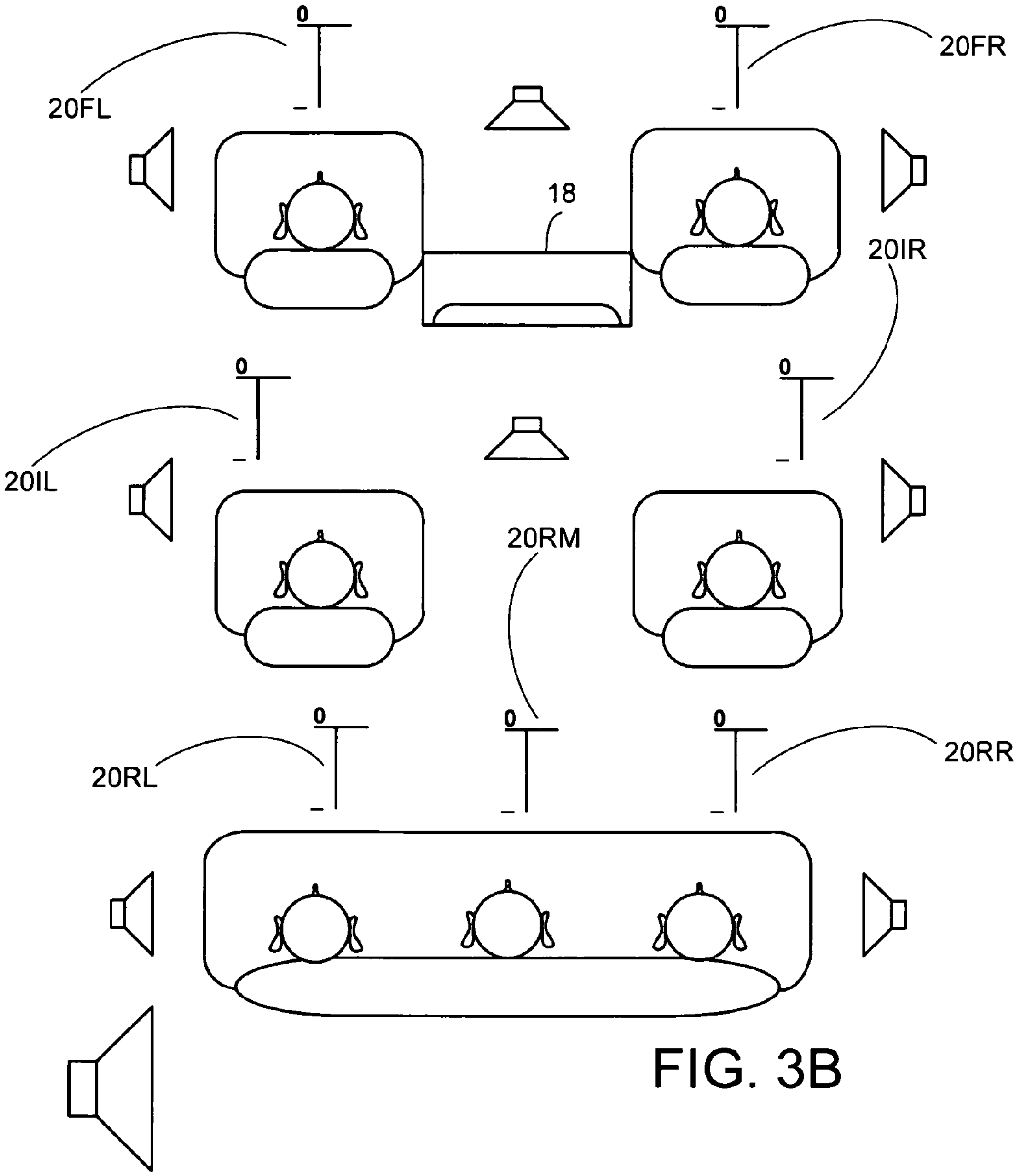

In the normal surround mode shown in FIG. 3B, the perceived loudness of the radiation at all listener locations is approximately the same, as indicated by the amplitude indicators 20FL-20RR.

Figure 3C:
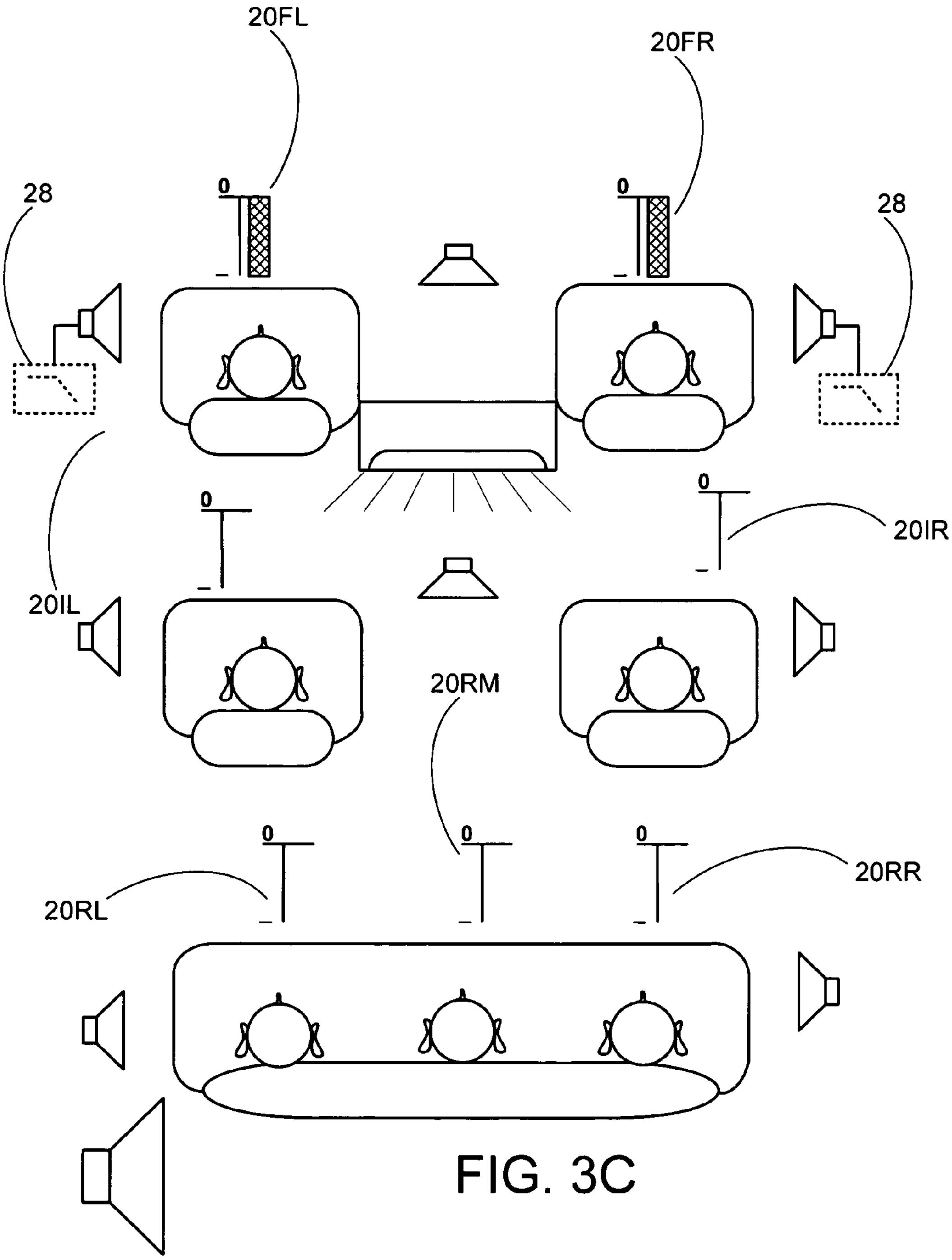

In the rear surround mode shown in FIG. 3C, the perceived loudness at the intermediate seating positions and rear seating positions is substantially the same, but the perceived loudness at the front seating positions may be significantly less than the perceived loudness at the intermediate and rear seating positions.

Figure 3D:
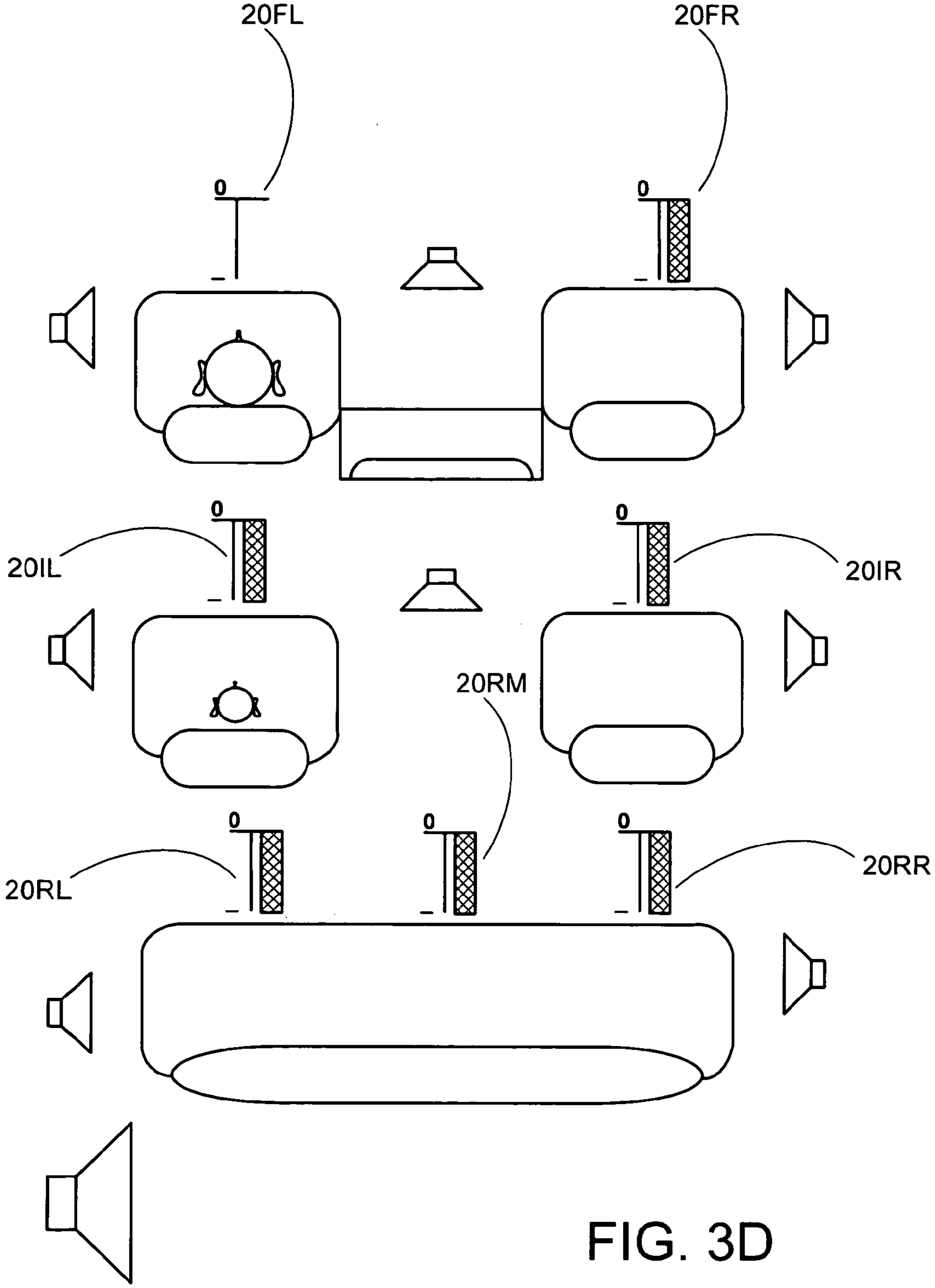

In the driver surround mode shown in FIG. 3D, the perceived loudness at the driver position is higher than the perceived loudness at other seating positions.

Figure 3E:
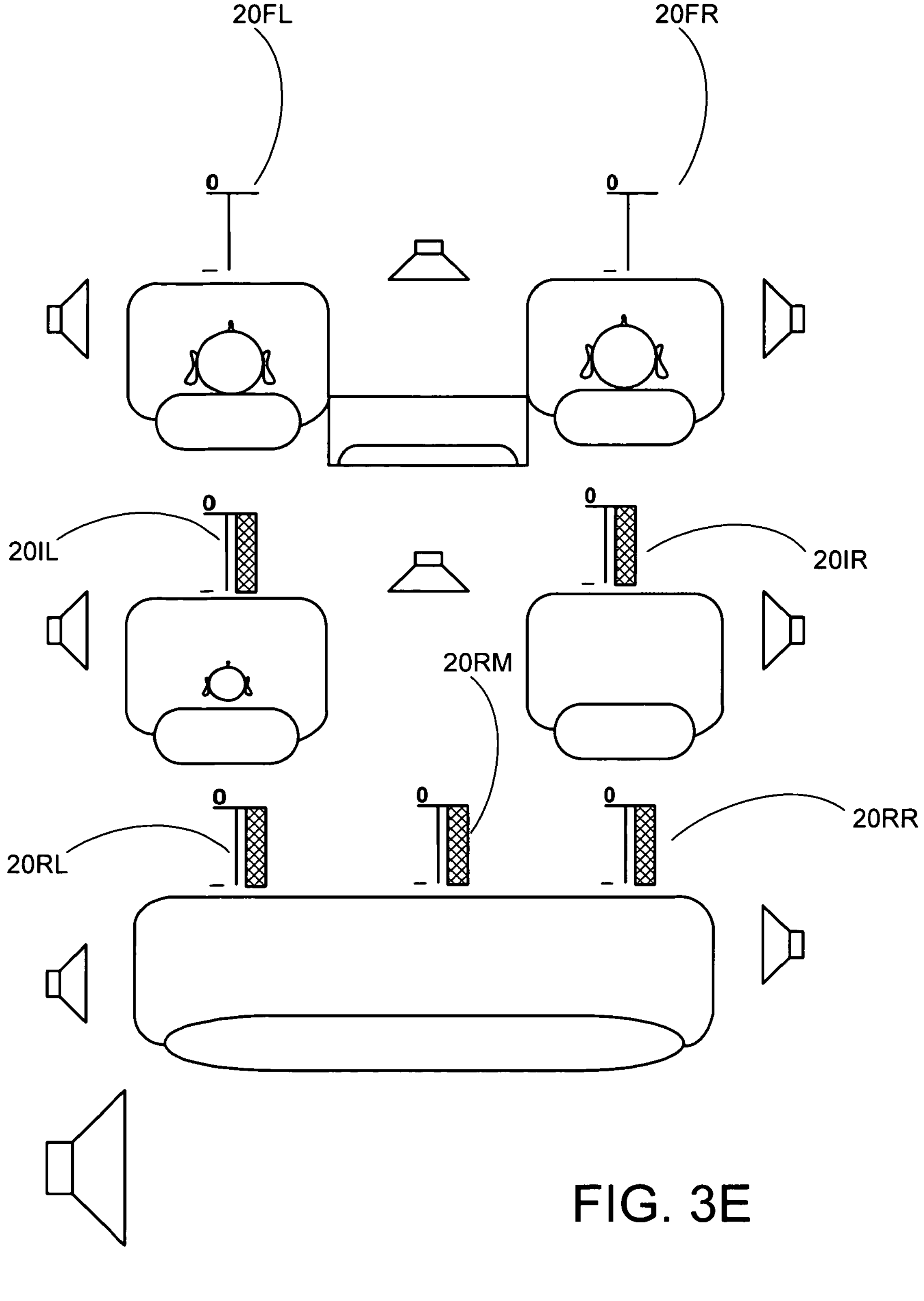

In the front surround mode shown in FIG. 3E, the perceived loudness at the front seating positions is higher than the perceived loudness at the intermediate and rear seating positions.

In general, higher "perceived loudness" is associated with higher average sound pressure level. Providing different perceived loudness in different seating areas is typically done by significantly attenuating, or even muting, loudspeakers nearest the lower perceived loudness area. In one variation, the audio signal to the front loudspeakers may be low pass filtered, for example, as indicated in FIG. 3B by low pass filters 28, so that the some speakers are used to radiate bass acoustic energy, but not high frequency acoustic energy.

An important component of sound quality is frequency response. Frequency response adjustment and correction is typically done using a process called equalization (EQ), in which some frequency bands are either attenuated or amplified relative to other frequency bands. Equalization is typically performed to compensate for non-ideal behavior of loudspeakers used to reproduce audio signals and for alterations of the transfer functions from loudspeaker to listener caused by the environment (such as the room or vehicle passenger compartment) in which the loudspeakers operate. Equalization typically includes taking measurements of the frequency response from various loudspeakers at a number of listening locations. The frequency responses at the locations are combined in some manner, such as by averaging or weighting (for example in vehicle, the listening location of the driver's seat or the front seat may be weighted more heavily than rear seat listening locations). An equalization pattern that modifies the frequency response is developed so that the frequency response curve has a desirable shape, such as flat or mildly sloped smooth shape, with the amplitudes of peaks and dips minimized.

Different modes consider or weight listening areas differently, resulting in differences in the combined frequency responses that are compensated for by the EQ process. Frequency response of EQ therefore varies with changes in surround modes. Improving the frequency response for a loudspeaker at one listening location my result in degrading the response for that loudspeaker at other listening locations. Improving the combined frequency response at one listening location may result in degrading the combined frequency response at other listening locations.

Another important component of sound quality is balance. Uniform balance means that at a listening position, a balanced amount of acoustic energy is perceived as received from each the loudspeakers, so that a listener does not localize predominantly on any one loudspeaker. Balance is modified by adjusting the transfer functions applied to the audio signals (which may include the equivalent of amplifying or attenuating the signals, delaying the signals, changing the phase of the signals, and other adjustments) so that the listener perceives an acoustic image that is not skewed to any particular location. The adjustments may be frequency dependent. Generally, uniform balance is desirable. In some circumstances, a desirable balance pattern may include delaying the arrival of radiation from the rear speakers for an enhanced sense of spaciousness. Balance is particularly important if an audio signal is radiated by more than one loudspeaker and if a listening location is near two loudspeakers that radiate the same signal. An example will be shown in FIGS. 4A-4B.

While balance is somewhat perceptual and subjective, two important measurable components of balance are sound pressure level generated at a location due to energy radiated by each speaker (hereinafter) each speaker and arrival time from each speaker. Determining sound pressure level can be done by applying test tones of equal amplitude from each of the loudspeakers and measuring the sound pressure level at a location. If the measured sound pressure level from each of the loudspeakers is substantially equal, the balance at that location is better than if the measured sound pressure level from the loudspeakers varies widely. To measure arrival time, test tones are radiated from the individual loudspeakers and length of time t it takes for the radiation to reach a location measured. If t for all the loudspeakers is about the same, the balance at that location is more uniform than if the test tones arrive at varying times. Perception of a balanced amount of radiation from the loudspeakers is a function of both t and sound pressure level. Balance often involves making time/intensity tradeoffs; for example greater sound pressure level from one loudspeaker can be compensated for by applying a delay Δt to the signal to delay arrival time from the speaker. Balance is particularly important if the same signal is radiated from more than one loudspeaker. Since in a vehicle the seating locations and the loudspeaker locations are substantially fixed and the loudspeakers are asymmetrically placed relative to the seating positions, it may be difficult to achieve a desirable balance pattern at all locations, and achieving a desired balance pattern at one location may cause deviation from that balance pattern at another locations.

Figure 4A:
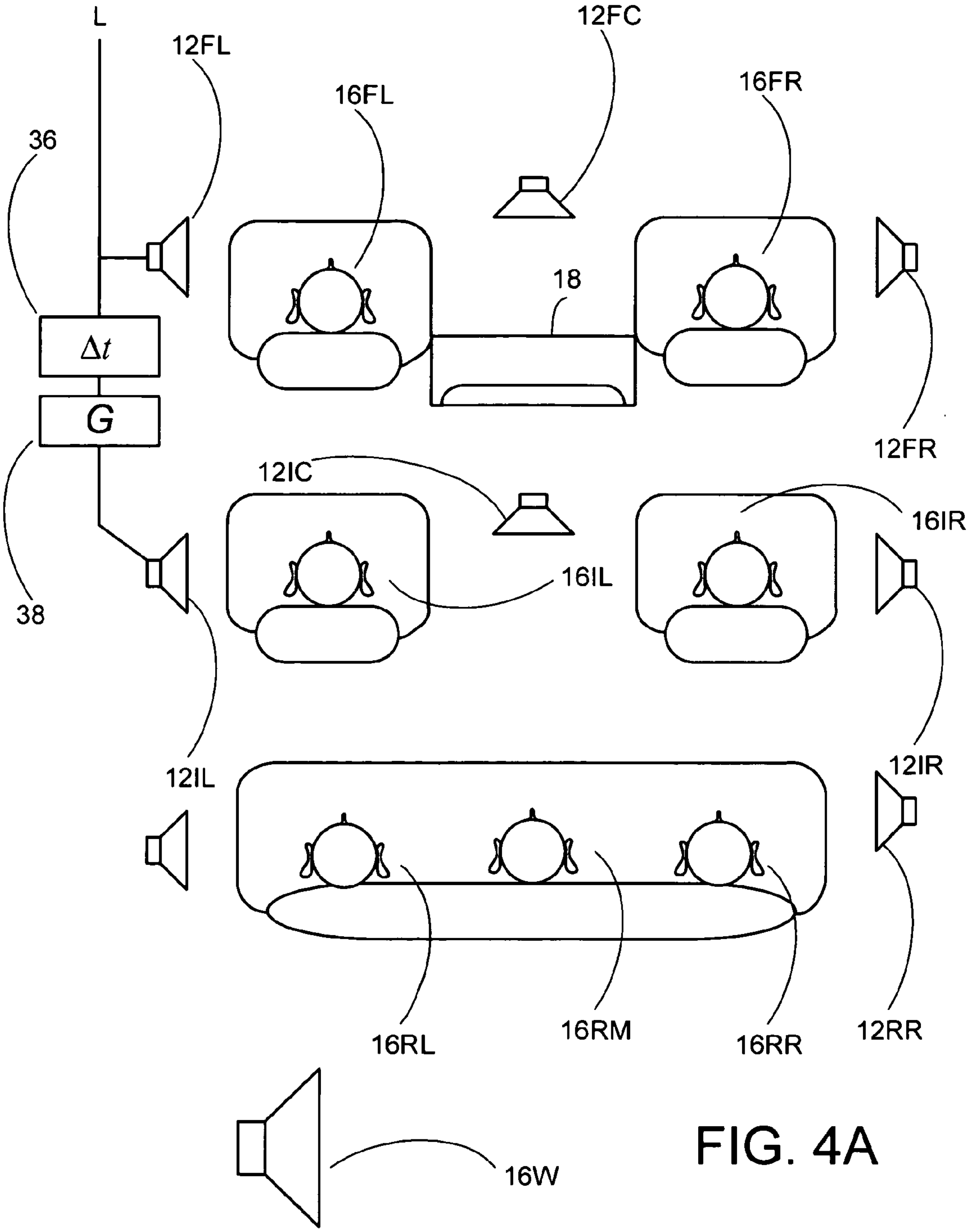
FIGS. 4A-4E are views of the acoustic environment of FIG. 2, illustrating another aspect of the invention.

Referring now to FIG. 4A, there is shown a simple example of adjusting arrival time and radiation intensity to achieve a desired balance result. Operating in normal surround mode, the channel L signal is transmitted to loudspeaker 12FL (relatively near to seating positions 16FL, 16FR, 16IL, and 16IR) to radiate channel L. The channel L signal may also transmitted to loudspeaker 12IL (relatively near to seating positions 16IL, 16IR, 16RL, 16RM, and 16RR) to radiate channel L. It may be desirable to prevent the listener in position 16FL from localizing on the L radiation from loudspeaker 12IL. It may also be desirable for the L radiation from loudspeaker 12FL and 12IL to reach listening locations 16IL and 16IR at about the same time, to avoid the impression of an echo. The L signal to loudspeaker 12IL is delayed by time delay 36 so that the arrival time at seating position 16FL of radiation from loudspeaker 12IL is later than the arrival time of radiation from loudspeaker 12FL and so that radiation from loudspeakers 12FL and 12IL arrive at seating location 16IL sufficiently close in time to prevent the impression of an echo. Also, the L signal to loudspeaker 12IL may be attenuated by attenuator 38 so that the radiation intensity at seating location 16FL from loudspeaker 12L is less than the radiation intensity from loudspeaker 12FL. For simplicity, time delay 36 and attenuator 38 and are shown as discrete blocks. In an actual implementation, the functions executed by the time delays and the attenuators could be executed by signal processing circuitry 4.

Figure 4B:
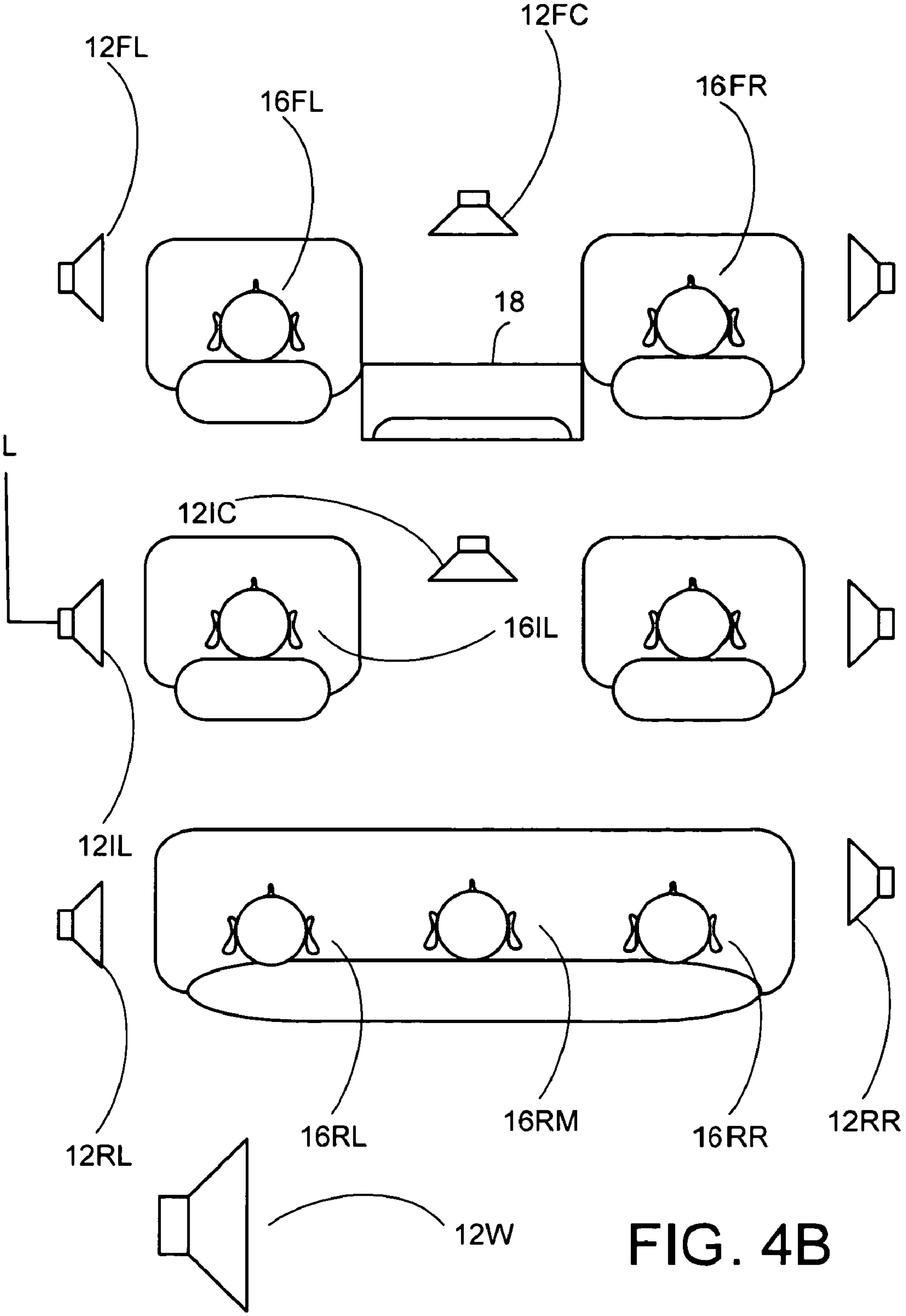

In FIG. 4B, operating in rear surround mode, it is not necessary to radiate the L channel to seating positions 16FL and 16FR or to consider where listeners in seating positions 16FL and 16FR might localize. The channel L signal may be transmitted to loudspeaker 12IL to radiate channel L to seating positions 16IL, 16IR, 16RL, 16RM, and 16RR. In the rear surround mode, time delay 36 and attenuator 38 of FIG. 4B are not required.

The R and C channels could be adjusted in a manner similar to the L channel.

Figure 4C:
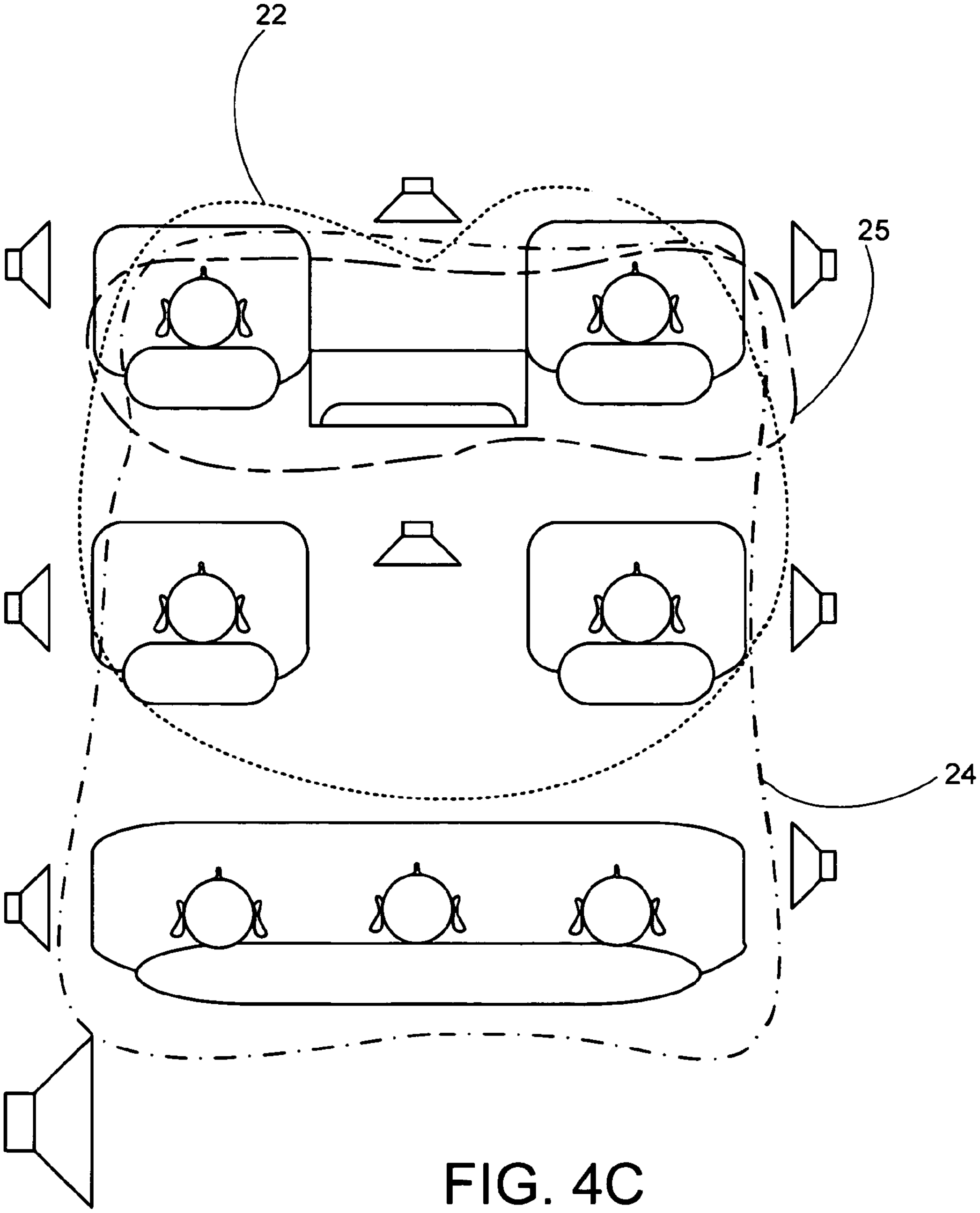
Figure 4D:
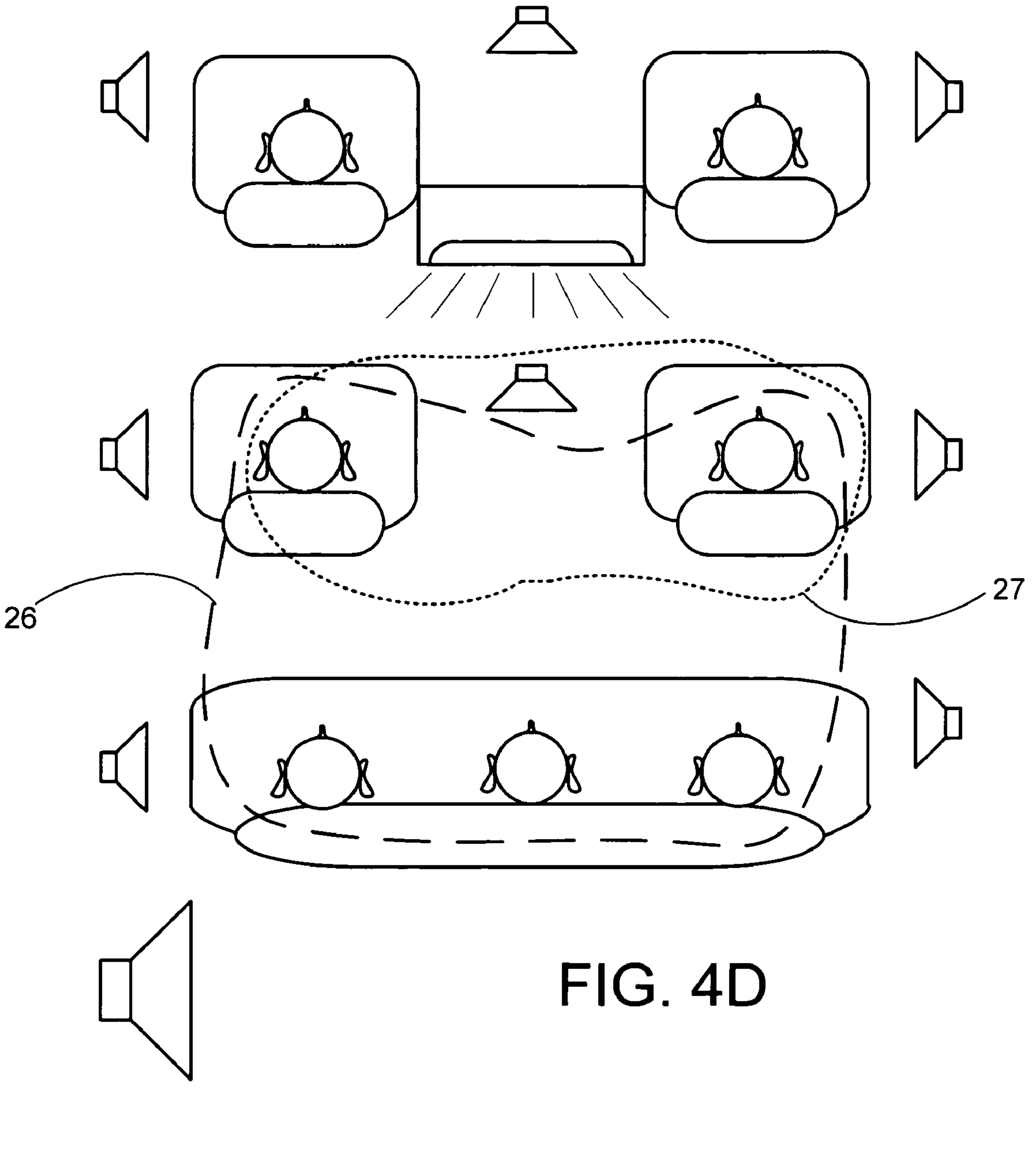
Figure 4E:
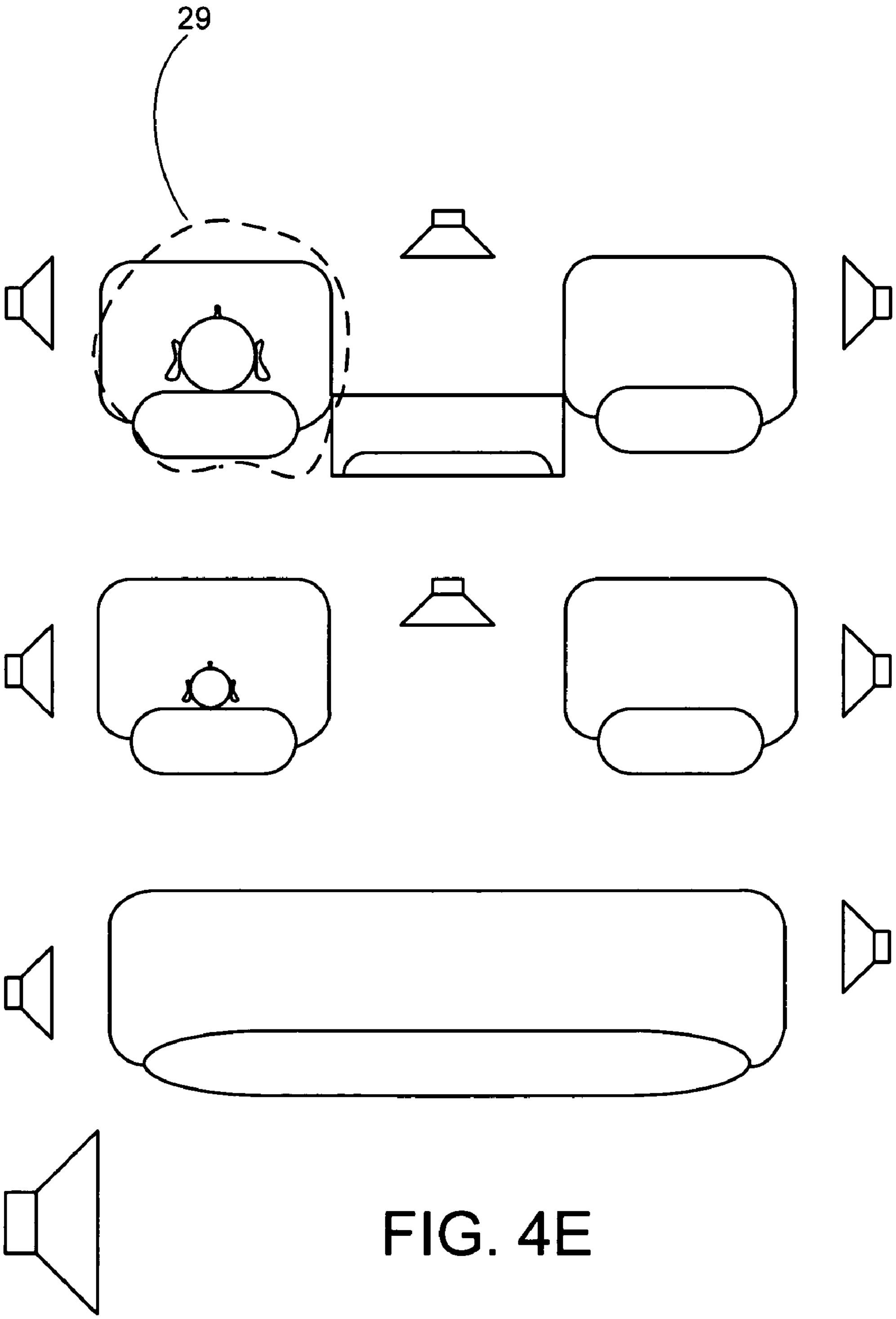
Figure 5A:
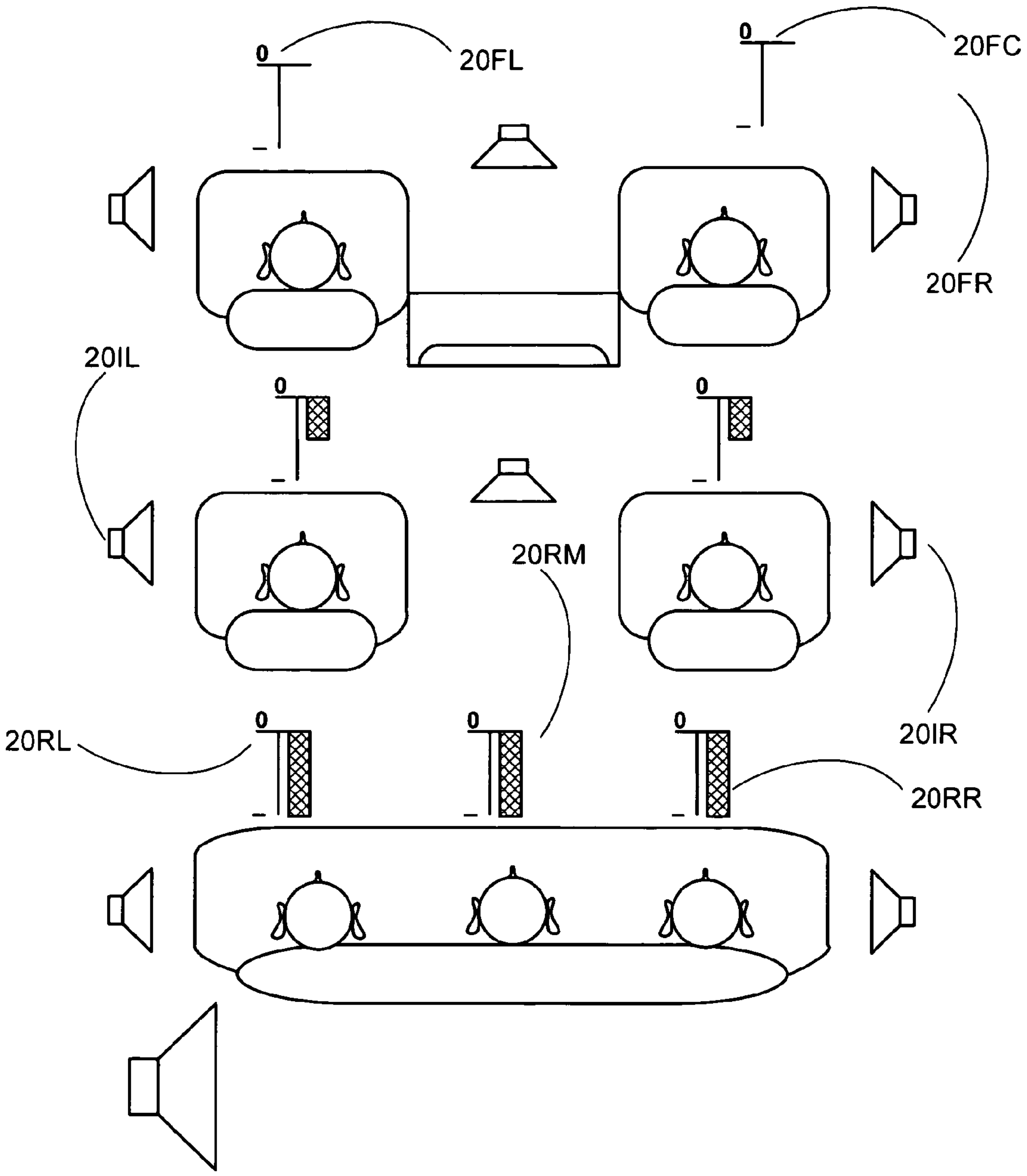
FIGS. 5A, 5B, 6A, and 6B are views of the acoustic environment of FIG. 2, illustrating yet another aspect of the invention.
Figure 5B:
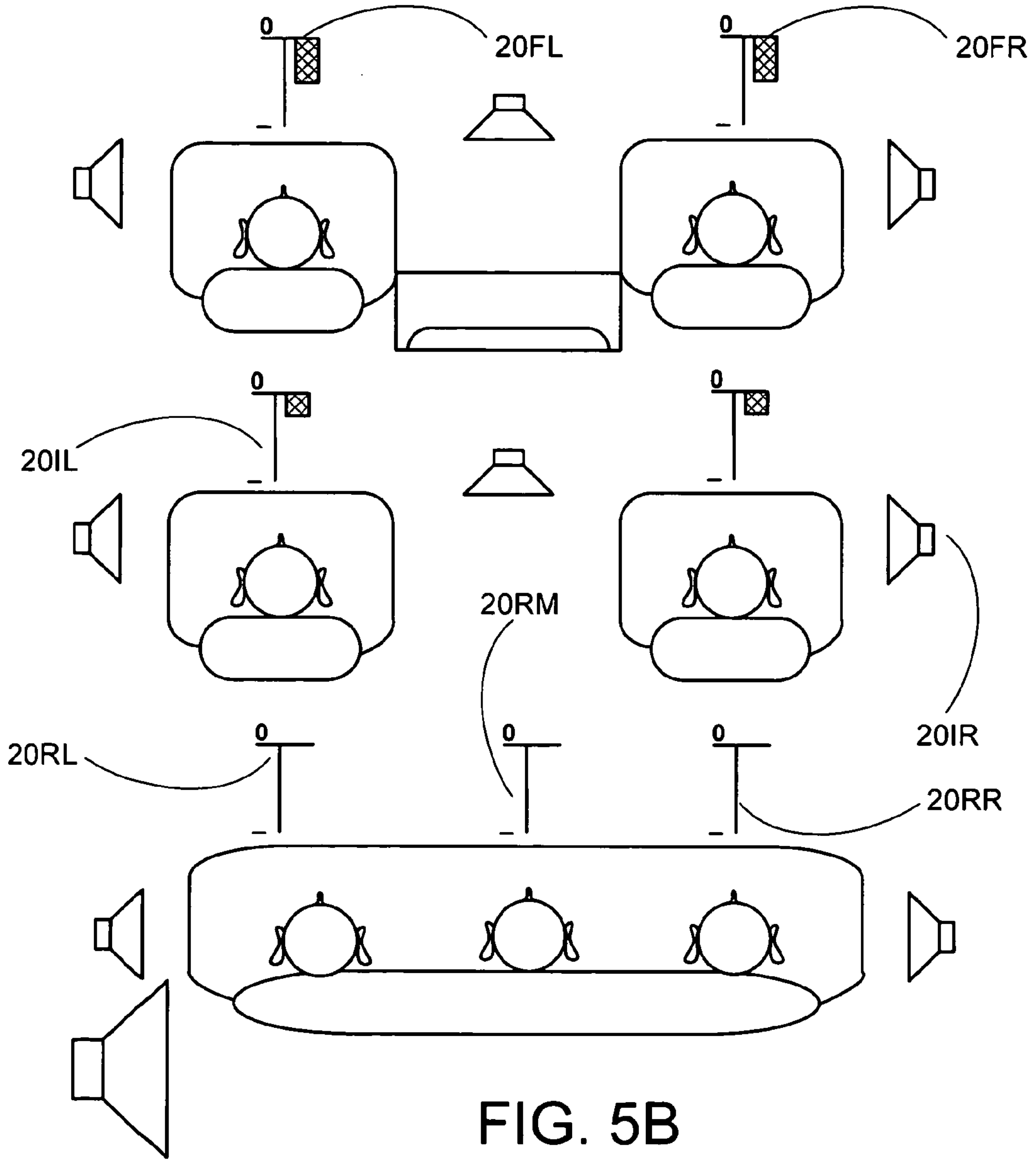

FIGS. 4C-4E illustrate different seating locations that may be emphasized or exclusively considered in developing balance and EQ patterns for the various surround modes. The normal surround mode EQ pattern may be developed by taking measurements (by a measuring device) and listenings (by a human listener) at locations that include all seating areas, as indicated by line 24

In some implementations of normal surround mode, measurements and listenings from the area indicated by line 25 or line 22 may be weighed somewhat more heavily than measurements and listenings from the rest of the passenger compartment in developing the EQ and balance pattern.

Referring still to FIG. 4C, EQ and balance development for the front surround mode could use the measurements and listenings exclusively from the area indicated by line 25.

As shown in FIG. 4D, the EQ and balance pattern for the rear surround modes may be developed by taking measurements in the areas that do not include the front seating positions or which weigh measurements and listenings at the front seat positions less heavily than measurements and listenings at other positions in the intermediate and rear seating areas. For example, measurement may be taken at the intermediate and rear seating areas, as indicated by line 26. In some implementations, measurements and listenings from the intermediate seating area, as indicated by line 27, can be weighted somewhat more heavily than measurements and listenings from the rear seating area.

In addition to taking into account different listening areas, the EQ pattern in a rear seat mode could be adjusted to result in a different frequency response curve than the normal surround mode. An example of a different frequency response curve is the so-called “X-Curve”, commonly associated with movie sound tracks and available as SMPTE Standard 202M-1998, from the Society of Motion Picture Television Engineers (SMPTE, internet url smpte.org).

Referring to FIG. 4E, the EQ and balance pattern for the driver surround mode may be developed by taking measurements and listenings in the driver seating area only, as indicated by line 29. One method of achieving good balance in the driver surround mode is to adjust the transfer functions applied to the audio signals so that the radiation from each of the loudspeakers is substantially equal and so that the time of arrival of radiation from each of the loudspeakers is substantially equal and so that the perceived loudness has the pattern of FIG. 3A or 3D.

FIGS. 5A and 5B and FIGS. 6A and 6B illustrate the front/rear fade behavior of the normal surround mode and the rear surround mode. A typical front/rear fade control system provides for biasing the relative amplitude of the acoustic radiation toward the front of a listening area or to the rear of a listening area. An adjustment device (such as a rotary knob or slide bar) typically allows a range of settings from one extreme, in which the relative amplitude of the acoustic radiation is strongly biased toward the front of the listening area (hereinafter “fade front”) to another extreme, in which the relative amplitude of the acoustic radiation is strongly biased toward the rear of the listening area (hereinafter “fade rear”). In the normal surround mode, with the front/rear fade set to fade front illustrated in FIG. 5A, the perceived loudness at the front seating location is the highest (as indicated by amplitude indicators 20FL-20RR), the perceived loudness at the rear seating location is lowest, and the perceived loudness at the intermediate seating location is between the perceived loudness at the front seating location and the rear seating location. In a fade front condition, listeners tend to localize toward the front speakers. In the normal surround mode, with the front/rear fade set to fade rear illustrated in FIG. 5B, the perceived loudness at the rear seating location is the highest, the perceived loudness at the front seating location is lowest, and the perceived loudness at the intermediate seating location is between the perceived loudness at the front seating location and the rear seating location. In a fade rear condition, listeners tend to localize toward the rear speakers.

Figure 6A:
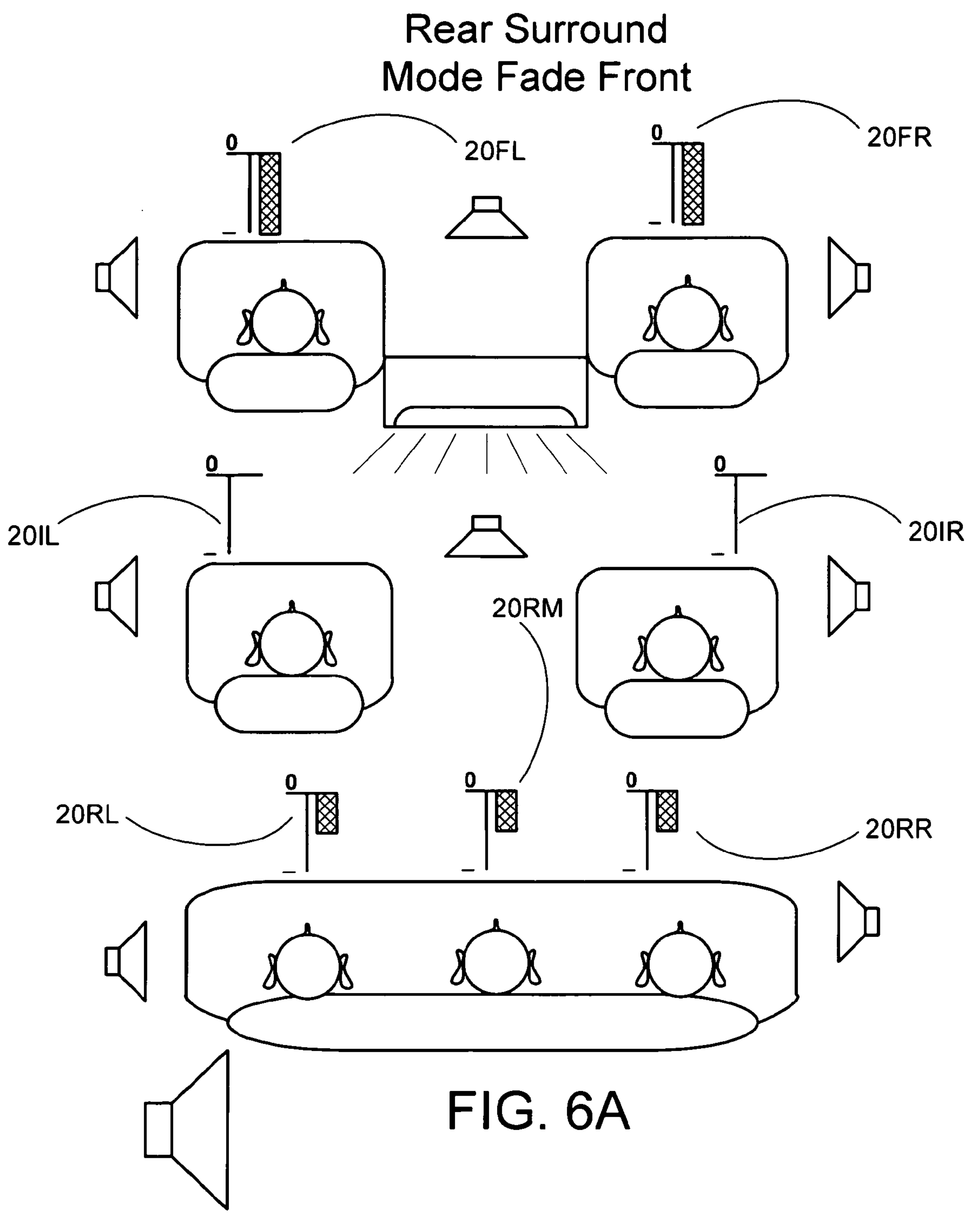
Figure 6B:
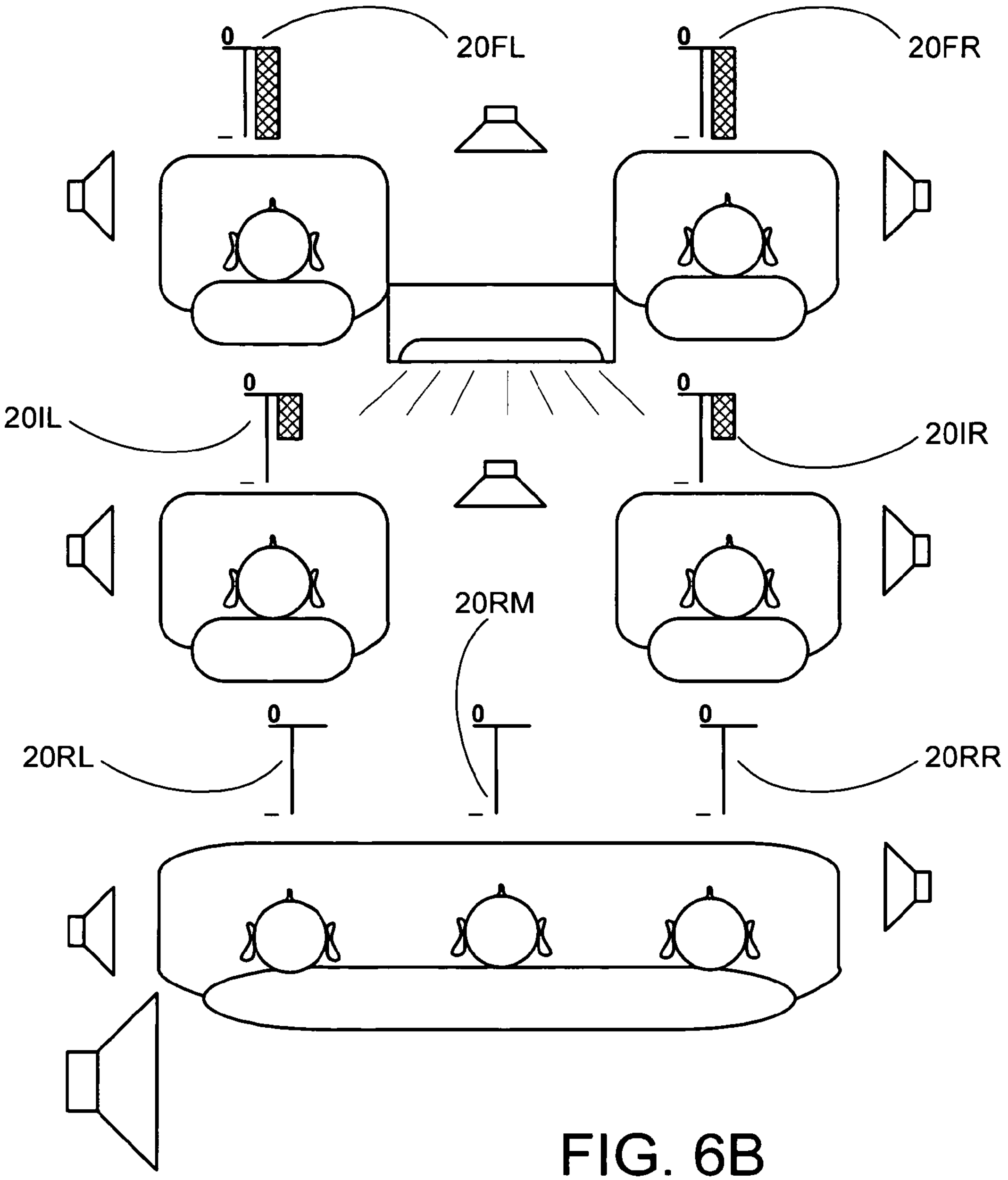

In an audio system according to the invention, operation of the front/rear fade function changes with the different surround modes. For example, the rear surround mode, with the front/rear fade set to fade front is + illustrated in FIG. 6A, the perceived loudness at the intermediate seating location is the higher than the perceived loudness at the rear seating location. In rear surround mode, the perceived loudness at the front seating location may be at a low level decoupled from the front/rear fade control; the front speakers 12FL, 12FC, and 12FR may be low pass filtered, significantly attenuated or muted. In the rear surround mode, with the front/rear fade set to fade rear as illustrated in FIG. 6B, the perceived loudness at the rear seating location is higher than the perceived loudness at the front seating location. As stated before, in rear surround mode, the perceived loudness at the front seating location may be at a low level decoupled from the front/rear fade control, and the front speakers 12FL, 12FC, and 12FR may be low pass filtered, significantly attenuated or muted.

If desired, the invention may be implemented with a front/rear fade adjustment control as described in co-pending U.S. patent application Ser. No. 10/367251, filed Feb. 14, 2003, assigned to the same assignee as the current application and incorporated herein by reference.

Selection of modes is done by control circuitry 3. Selection may be based on one of, or a combination of, manual selection, in which the user selects a mode, which may include a switch arrangement, in which the mode is selected by the current position of a switch; automatic selection, in which the control circuitry selects a mode based on predetermined rules (typically including a provision for manual override of the automatic selection); or a default system, in which case one mode is selected unless manually overridden. Automatic selection methods may include detecting of whether an input media device is a DVD-Audio disk or Super Audio CD (SACD) disk or a DVD-video disk, or reading metadata embedded in the source signal. Additionally, automatic selection methods may include detecting conditions of the vehicle, for example detecting if the vehicle ignition is in the "on" position or if the vehicle transmission is in a drive gear or detecting which seating positions are occupied.

An example of automatic selection could include: detecting if the audio signal source has associated video content; determining whether the vehicle ignition is on; if there is associated in video content and the ignition is on, selecting rear surround mode, and in other conditions selecting full surround mode.

The invention has been described using a minivan or a sport utility vehicle having three rows of seats. The principles of the invention can also be applied to vehicles having two rows of seats or more than three rows of seats such as a large van or small bus.

A vehicle audio system according to the invention is advantageous over conventional vehicle audio systems because it reduces intrusion of the audio program to areas of the vehicle cabin in which the audio program may be unwanted, annoying, or distracting, while providing for an improve acoustic experience to other areas of the vehicle cabin.

It is evident that those skilled in the art may now make numerous uses of and departures from the specific apparatus and techniques disclosed herein without departing from the inventive concepts. Consequently, the invention is to be construed as embracing each and every novel feature and novel combination of features disclosed herein and limited only by the spirit and scope of the appended claims.

What is claimed is:

1. A front/rear fade system for a multi-channel surround sound audio system for a vehicle, the surround sound audio system comprising a plurality of loudspeakers comprising front loudspeakers, intermediate loudspeakers, and rear loudspeakers, the front/rear fade system comprising:

a first operating mode in which extreme "front" and "rear" positions of a fade control bias a relative amplitude of acoustic radiation respectively toward a front of a listening area or a rear of the listening area by varying relative amplitudes of output of each of the front loudspeakers, intermediate loudspeakers, and rear loudspeakers according to the position of the fade control, and a second operating mode in which the extreme "front" and "rear" positions of the fade control bias the relative amplitude of the acoustic radiation respectively toward an intermediate position of the listening area or the rear of the listening area by holding the amplitude of the output of the front loudspeakers constant for any position of the fade control and varying the relative amplitudes of output of each of the intermediate loudspeakers and rear loudspeakers according to the position of the fade control.

2. A front/rear fade system in accordance with claim 1, wherein the second operating mode is characterized by the front loudspeakers radiating a low level of high frequency radiation regardless of the fade control position.

3. A front/rear fade system in accordance with claim 1, wherein the second operating mode is characterized by a fade front condition in which perceived loudness from the intermediate loudspeakers is greater than the perceived loudness from the front loudspeakers.

4. A front/rear fade system in accordance with claim 1, wherein in one of the operating modes the fade control affects high frequencies only.

5. A front/rear fade system in accordance with claim 1, wherein the second operating mode is further characterized by an audio signal to the front loudspeakers being low pass filtered.

6. A front/rear fade system in accordance with claim 1, wherein a front seating location is positioned at the front of the listening area, an intermediate seating location is positioned at the intermediate position of the listening area, a back seating location is positioned at the rear of the listening area, the acoustic radiation corresponds to a plurality of audio channels comprising surround channels, and the first operating mode is characterized by a first fade front condition in which the an amplitude of the acoustic radiation is biased toward the front seating location; and the second operating mode is characterized by a second fade front condition in which the amplitude of the acoustic radiation is biased toward the intermediate seating location so that an amplitude of acoustic radiation in the intermediate seating location is greater than an amplitude of the acoustic radiation in the front location and the back seating location.

7. A front/rear fade system in accordance with claim 1, wherein in the second mode, a relative amplitude of the acoustic radiation in the front of the listening area is low relative to the intermediate position of the listening area and the rear of the listening area regardless of the fade control position.

8. The front/rear fade system of claim 1 further comprising circuitry configured to:

detect at least one of (a) an operating condition of the vehicle, and (b) a characteristic of a media object being played by the audio system, to provide selection criteria, and based on the selection criteria, automatically select one of the first operating mode or the second operating mode.

9. The signal processing circuitry of claim 8 wherein the circuitry is configured to select the second operating mode if:

the selection criteria indicate at least one of (a) the vehicle ignition is on, and (b) the transmission is in a drive gear, and the selection criteria further indicate that the media object includes video information.

* * * * *

UNITED STATES PATENT AND TRADEMARK OFFICE

CERTIFICATE OF CORRECTION

PATENT NO. : 7,653,203 B2
APPLICATION NO. : 10/756028
DATED : January 26, 2010
INVENTOR(S) : Holmi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1648 days.

Signed and Sealed this

Twenty-third Day of November, 2010

David J. Kappos

*Director of the United States Patent and Trademark Office*